(12) United States Patent
Bhardwaj et al.

(10) Patent No.: US 10,428,877 B2
(45) Date of Patent: Oct. 1, 2019

(54) ADAPTOR

(71) Applicant: Cummins Generator Technologies Limited, Peterborough (GB)

(72) Inventors: Rahul Bhardwaj, Columbus, IN (US); Dumitru Razvan Stanca, Craiova (RO); Daniel Ciochina, Craiova (RO); Radu Caplescu, Craiova (RO); Popescu Ionut, Craiova (RO)

(73) Assignee: Cummins Generator Technologies Limited, Peterborough (GB)

( * ) Notice: Subject to any disclaimer, the term of this patent is extended or adjusted under 35 U.S.C. 154(b) by 262 days.

(21) Appl. No.: 15/210,180

(22) Filed: Jul. 14, 2016

(65) Prior Publication Data
US 2017/0016485 A1 Jan. 19, 2017

(30) Foreign Application Priority Data

Jul. 15, 2015 (EP) ..................................... 15176912

(51) Int. Cl.
*F16D 3/84* (2006.01)
*H02K 7/00* (2006.01)
*F16D 3/54* (2006.01)
*F16D 3/76* (2006.01)
*F02B 63/04* (2006.01)
*F02B 67/04* (2006.01)

(52) U.S. Cl.
CPC ............... *F16D 3/843* (2013.01); *F16D 3/54* (2013.01); *F16D 3/76* (2013.01); *H02K 7/003* (2013.01); *F02B 63/04* (2013.01); *F02B 67/04* (2013.01)

(58) Field of Classification Search
CPC . F16D 3/843; F16D 3/54; H02K 7/003; F02B 63/04; F02B 67/04

USPC .................... 464/91, 172, 176, 177; 285/367
See application file for complete search history.

(56) References Cited

U.S. PATENT DOCUMENTS

| | | | |
|---|---|---|---|
| 732,400 A * | 6/1903 | Dresser | |
| 1,775,556 A * | 9/1930 | Hewel | F16D 3/76 464/91 |
| 2,736,819 A | 2/1956 | Murray | |
| 6,190,261 B1 * | 2/2001 | Powell | F16D 3/843 |

(Continued)

FOREIGN PATENT DOCUMENTS

| GB | 2 515 540 A | 12/2014 |
|---|---|---|
| WO | WO 2008/039732 A2 | 4/2008 |
| WO | WO 2008/148142 A2 | 12/2008 |

OTHER PUBLICATIONS

Universal Joint and Driveshaft Design Manual, AE-7, Society of Automotive Engineers, Inc., Warrendale, PA, 93-95, TJ1079.S62 (Year: 1979).*

(Continued)

*Primary Examiner* — Greg Binda
(74) *Attorney, Agent, or Firm* — Foley & Lardner LLP

(57) ABSTRACT

An adaptor is disclosed for connecting a generator to a prime mover. The adaptor comprises two separable parts. By providing an adaptor comprising two separable parts, it may be possible for one part to be removed in order to allow access to moving parts which would otherwise be inaccessible. This may simplify the process of servicing moving parts such as a coupling or bearings, without requiring the generator and the prime mover to be moved apart. A coupling with a radially removable elastomeric component is also disclosed.

13 Claims, 10 Drawing Sheets

(56) References Cited

U.S. PATENT DOCUMENTS

| | | | |
|---|---|---|---|
| 6,241,618 B1* | 6/2001 | Doll | F16P 1/02 |
| | | | 464/176 |
| 2013/0068049 A1 | 3/2013 | Chang | |
| 2018/0145559 A1* | 5/2018 | Johnson | F02B 63/044 |

OTHER PUBLICATIONS

European Search Report for European Patent Application No. 15176912.2, dated Jan. 15, 2016, 9 pages.

* cited by examiner

ADAPTOR

CROSS-REFERENCE TO RELATED APPLICATION

The present application claims priority to European Patent Application No. 15176912.2, filed Jul. 15, 2015, the contents of which are incorporated herein by reference in its entirety.

BACKGROUND OF THE INVENTION

The present invention relates to an adaptor for connecting a generator to a prime mover in a power generation system, and in particular an adaptor which can facilitate servicing of parts of the system.

Power generation systems typically comprise a prime mover which drives an electrical generator in order to produce output electrical power. For example, a power generating set may comprise an engine coupled to a generator (alternator). Typically the crankshaft of the engine is mechanically coupled to the shaft of the generator using a coupling.

In a power generation system it is necessary for the prime mover and the generator to be precisely aligned, to ensure concentricity of the rotating parts. In a generating set this is usually achieved by mounting the engine and the generator on a bed frame. In addition, an adaptor may be used to connect non-rotating parts of the generator and the engine. The adaptor provides additional stability and helps to prevent relative movement between the engine and the generator.

During the lifetime of the power generation system it may become necessary to service some of the moving parts. For example, in certain generating sets, it may become necessary to service parts such as the coupling between the engine and the generator, and/or the engine or generator bearings.

Existing power generating systems typically require the generator to be moved to provide access for servicing moving parts. In order to move the generator it must first be disconnected. Following servicing, the generator must be reconnected and the engine and generator re-aligned. As a consequence, the servicing of moving parts can be time consuming, complex and costly. For example, the servicing repair time for the coupling on a typical gas generator set installation may be around 14 to 15 hours.

Existing adaptors are usually cylindrical, and surround the generator shaft and/or the coupling. Such adaptors are typically formed from a single cast piece of metal. Openings or windows may be provided in the adaptor to allow an operator to connect the rotating parts. However these openings do not normally allow servicing of moving parts.

SUMMARY OF THE INVENTION

According to a first aspect of the present invention there is provided an adaptor for connecting a generator to a prime mover, the adaptor comprising two separable parts.

The present invention may provide the advantage that, by providing an adaptor comprising two (or more) separable parts, it may be possible for one part to be removed in order to allow access to moving parts. Thus the present invention may simplify the process of servicing moving parts, in comparison to previous techniques.

Preferably one part of the adaptor can be removed while the other part is connected between the generator and prime mover. This may allow access to moving parts to be provided without requiring the generator and/or engine to be moved. This this arrangement may allow the alignment between the generator and the engine to be maintained.

Preferably each part of the adaptor is connectable between the generator and the prime mover. For example, each part of the adaptor may comprise a first flange for connection to the engine and a second flange for connection to the generator. Thus each part of the adaptor may be structural, which may help to provide rigidity between the engine and the generator.

Preferably the removal of one part of the adaptor exposes the inside of the adaptor. Thus, in use, the removal of one part of the adaptor may expose parts which are inside or adjacent to the adaptor, such as a coupling or bearing. This may allow servicing of those parts which would otherwise be inaccessible due to the presence of the adaptor.

Preferably a part of the adaptor which has been removed can be reinstalled, for example, following the servicing of a moving part. In order to facilitate reinstallation, the removable part of the adaptor may comprise at least one fit bolt. The fit bolt may engage, for example, with the generator or the prime mover. This may help to locate the removable part when it is reinstalled.

Preferably the two separable parts of the adaptor are connectable, for example by means of bolts or clamps. This can help to ensure that the adaptor has the required mechanical stiffness.

At least one of the two separable parts may comprise a centering pin which engages with the other separable part. This may help to locate a removable part when it is reinstalled.

Preferably each separable part comprises a flange for interfacing with the other part. This may help to ensure a connection between the two parts with the required mechanical rigidity. The flanges comprise bolt holes for connecting the two parts. Alternatively some other means such as clamps may be used for connecting the two parts.

The adaptor may be cylindrical in shape, and is preferably in the form of an open cylinder. This can allow rotating components, such as a generator shaft and/or a coupling, to be located inside the adaptor.

The two parts of the adaptor may be separable along lines which run in an axial direction between one end of the adaptor and the other. Thus, where the adaptor is in the form of an open cylinder, the lines may run between one open end of the cylinder and the other. However other arrangements are also possible, and for example a removable part of the adaptor may extend along only part of the length of the adaptor in an axial direction.

The lines of separation between the two parts of the adaptor may be straight, or some other shape such as curved, waved, serrated or castellated. In one embodiment, the lines are substantially parallel to an axis of rotation of the electrical machine, and/or parallel to each other.

If desired, the adaptor may be separable into three or more different parts. In this case, at least one part may be separable from the or each other part, while at least one part remains connected between the prime mover and the generator.

The adaptor is preferably arranged to surround a coupling between the engine and the generator. By providing by providing an adaptor comprising two separable parts, it may be possible for one part to be removed in order to allow the coupling to be serviced. Furthermore, it may be possible to access other parts such as bearings for servicing and/or replacement.

The adaptor may be produced using any appropriate technique such as casting, machining, or a combination of the two. In a preferred embodiment the adaptor is at least initially cast. The cast adaptor may subsequently be machined to produce the final adaptor.

According to another aspect of the present invention there is provided a power generation system comprising a prime mover, a generator and an adaptor in any of the forms described above.

The power generation system may further comprise a coupling for connecting rotating components of the generator and the prime mover. The coupling may be a flexible coupling, which may help to dampen vibratory torque in the system and/or act as a fuse in the drive line.

Flexible couplings typically comprise an elastomeric component, in order to provide the desired flexibility. The elastomeric component may be, for example, rubber or any other appropriate material. In use, the elastomeric component may degrade over time, and may require replacement. This is typically a complex operation requiring removal of the generator and/or engine.

In a preferred embodiment of the invention, the coupling comprises an elastomeric component which is removable radially from the coupling. This may allow the elastomeric component to be removed and replaced by removing a part of the adaptor.

The elastomeric component is preferably removable without requiring removal of the generator. Preferably one part of the adaptor is removable to leave an opening while the other part of the adaptor remains in place, and the elastomeric component is removable through the opening.

In one embodiment, the coupling comprises a hub and a coupling flange, and the elastomeric component is located between the hub and the coupling flange. For example, the elastomeric component may be disc-shaped, and may be located inside the coupling flange. This may provide a compact coupling arrangement.

In order to allow the elastomeric component to be removed, the coupling may be arranged such that the coupling flange can be moved axially in order to disengage with the elastomeric component. A locking assembly may be provided for holding the coupling together during operation of the power generation system. The locking assembly, when disconnected, may be movable in an axial direction, in order to reveal the hub.

In one embodiment the coupling comprises two elastomeric components, both of which may be located between the hub and a coupling flange, and both of which may be removable. At least one of the elastomeric components may be located around the hub. One or both of the elastomeric components may be located inside the coupling flange.

Alternatively, other types of flexible coupling may be used. For example, the elastomeric component may be located adjacent to at least one of the hub and the coupling flange in an axial direction.

The power generation system may further comprise a bed frame on which the prime mover and generator are mounted. Preferably one part of the adaptor can be removed to provide access to serviceable parts without removing the prime mover or the generator from the bed frame.

The prime mover may be, for example, an internal combustion engine, such as a gas engine, a diesel engine or a petrol engine, or some other type of prime mover such as a wind or wave turbine. The generator may be any type of electrical generator, such as a synchronous generator or a permanent magnet generator.

Corresponding methods may also be provided. Thus according to another aspect of the invention there is provided a method of servicing a power generation system comprising a prime mover coupled to a generator via an adaptor, the adaptor comprising two separable parts, the method comprising removing one part of the adaptor while the other part of the adaptor remains connected between the prime mover and the generator in order to provide access to serviceable parts.

The power generation system may further comprise an elastomeric coupling, and the method may further comprise removing the elastomeric component of the coupling through an opening left by the removed part of the adaptor. Preferably the elastomeric component is removed in a radial direction and/or without moving the generator.

In the present specification terms such as "radial", "axial", "circumferential" etc. are generally defined with reference to the axis of a generator and/or engine to which the adaptor is to be connected, and/or the longitudinal axis of the adaptor.

Features of one aspect of the invention may be provided with any other aspect. Apparatus features may be provided with method aspects and vice versa.

Preferred features of the present invention will now be described, purely by way of example, with reference to the accompanying drawings.

DESCRIPTION OF PREFERRED EMBODIMENTS

Overview

Figure 1:
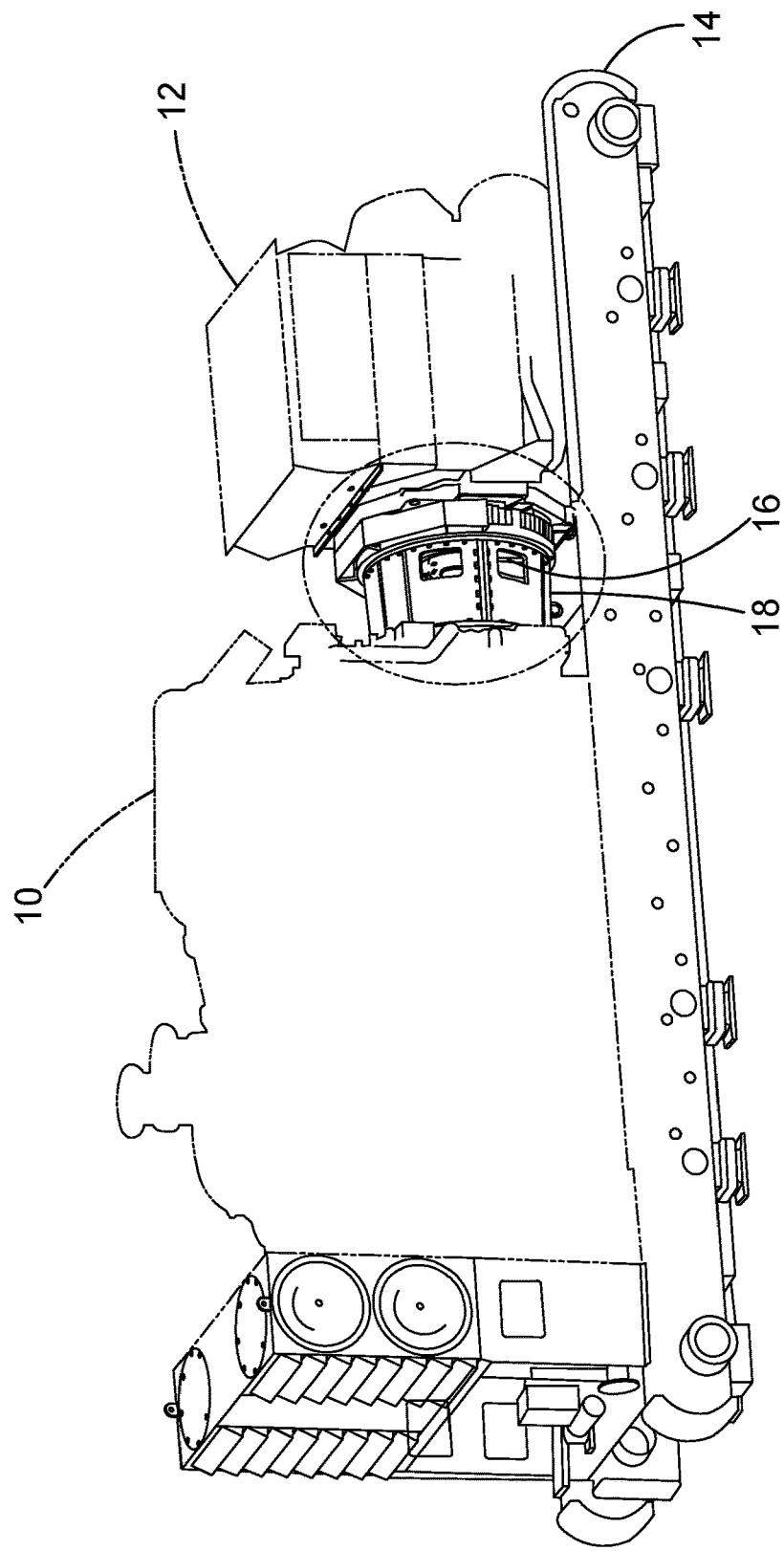
FIG. 1 shows an overview of a generating set in an embodiment of the present invention.

FIG. 1 shows an overview of a generating set in an embodiment of the present invention. Referring to FIG. 1, the generating set comprises an engine 10 coupled to a generator (alternator) 12. In this embodiment the engine 10 is a gas engine, although any type of internal combustion engine such as a petrol or diesel engine may be used instead. In this embodiment the generator 12 is a synchronous generator, although any other type of electrical generator may be used instead. The engine 10 and generator 12 are both mounted on a bed frame 14. A coupling 16 is used to connect the engine flywheel to the shaft of the generator. An adaptor 18 surrounds the coupling, and is used to connect the engine to the generator housing. The adaptor 18 helps to prevent relative movement between the engine and the generator, thus ensuring greater stability during operation of the generating set.

In the embodiment of FIG. 1, the coupling 16 is a flexible coupling. Flexible couplings are typically used in high power generating sets. For example, high horse power continuous purpose gas generating sets may require a flexible coupling, in particular where a variety of gases such as low BTU natural gas to pipeline gas are used. The flexible coupling can dampen vibratory torque in the system and acts as fuse in the drive line.

Flexible couplings typically include an elastomeric material. The elastomeric material may degrade over time, particularly when subject to high stresses. As a consequence, the life time of a flexible coupling varies depending on its application. In some cases the flexible coupling may fail before the end of its target life. In this case servicing of the coupling may be required outside of a scheduled overhaul of the generator set.

In existing generator set designs, the adaptor is formed from a single piece of cast metal. Windows may be provided in the adaptor, to allow an operator to connect the coupling once the generator and engine have been aligned. However this does not allow replacement or servicing of the coupling.

In order to service the coupling in existing generator set designs, the generator set is first shut down. All harnesses and other connections are disconnected, and the generator with adaptor is pulled back from the engine. Following replacement or servicing of the coupling, it is necessary for all parts to be reconnected, and the generator to be re-aligned with the engine.

As a consequence, replacement or servicing of the coupling is a complex and time consuming process, typically taking 14 to 15 hours depending on the installation. This results in high shutdown costs, both in terms of the servicing required and the lost generating capacity.

Adaptor Design

Embodiments of the present invention relate to a new adaptor design and a new flexible coupling which can facilitate servicing without requiring the generator to be moved.

Figure 2:
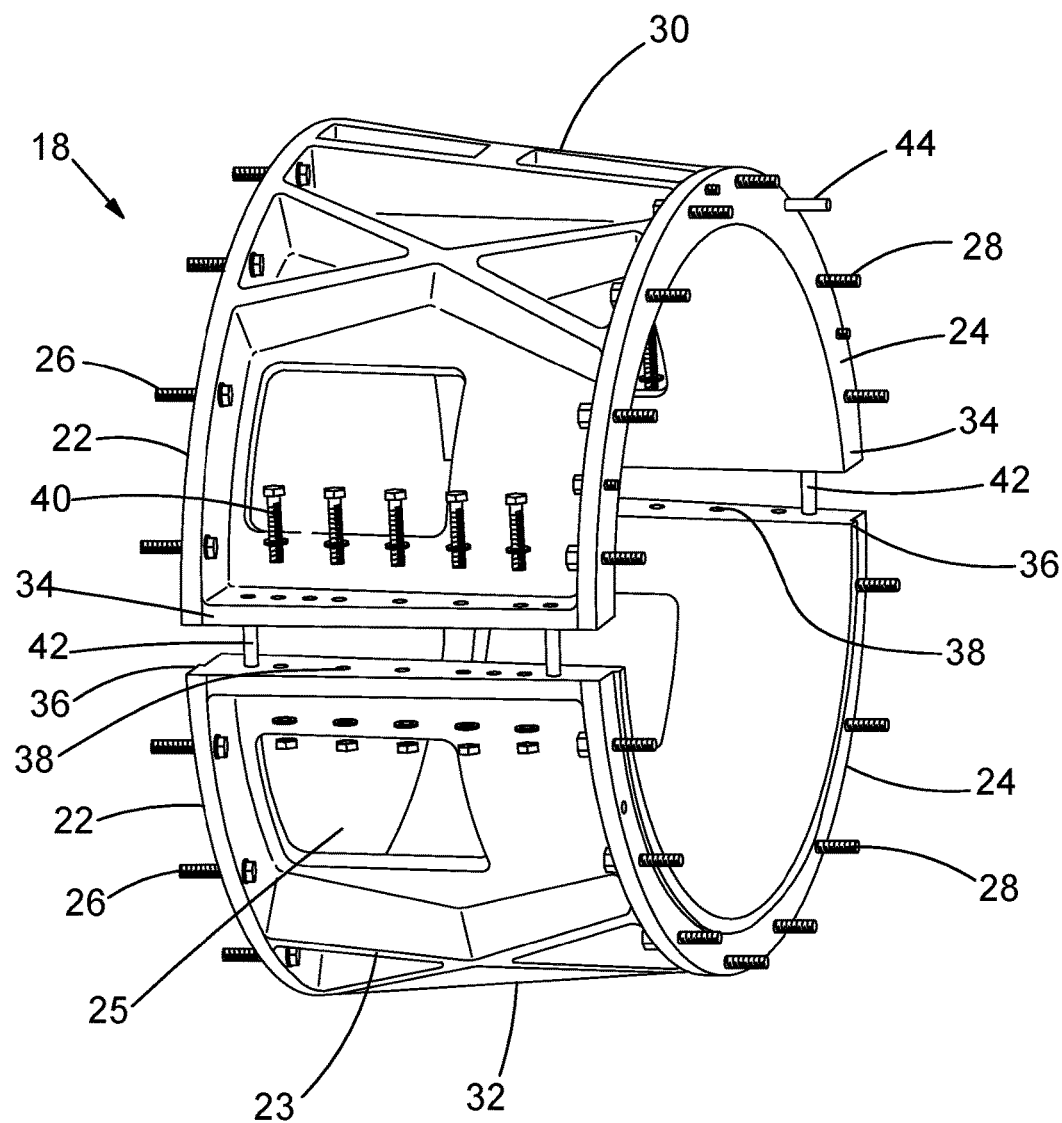
FIG. 2 shows an adaptor in an embodiment of the present invention.

FIG. 2 shows an adaptor 18 in an embodiment of the present invention. Referring to FIG. 2, the adaptor 18 is generally cylindrical, and comprises a first flange 22 for connection to the generator and a second flange 24 for connection to the engine. The first flange and second flange each comprise a number of bolt holes. Bolts 26 pass through the bolt holes in the first flange in order to connect the adaptor to the generator, while bolts 28 pass through the bolt holes in the second flange in order to connect the adaptor to the engine. In this embodiment cross braces 23 are provided on the outside surface of the adaptor, to help provide structural rigidity. Windows 25 are provided in the adaptor, to allow an operator to lock the coupling on generator shaft once the engine, generator and adaptor are in place.

In the arrangement of FIG. 2, the adaptor 18 is divided into a top part 30 and a bottom part 32. In this embodiment the division occurs in a plane within which the axis of symmetry of the adaptor lies. Thus, in this embodiment the two halves are semi-cylindrical. However the division may occur in different places and the two parts are not necessarily equal.

Still referring to FIG. 2, flanges 34, 36 are provided at the interfaces between the top part and the bottom part. Each of the flanges has a number of bolt holes 38. Bolts 40 pass through the bolt holes to connect the two parts together. Two additional centering pins 42 are provided on each side of the adaptor. The centering pins 42 help to ensure alignment between the two parts of the adaptor. In addition, centering pins 44 are provided in the second flange 24 in the top part 30. The centering pins 44 help to ensure alignment of the top part 30 with the engine, in particular following removal of the top part in the way described below.

The adaptor 18 of FIG. 2 may be made from a cast metal, such as spheroidal graphite cast iron. The adaptor may be machined following casting to provide the appropriate interface surfaces and/or bolt holes.

Figure 3:
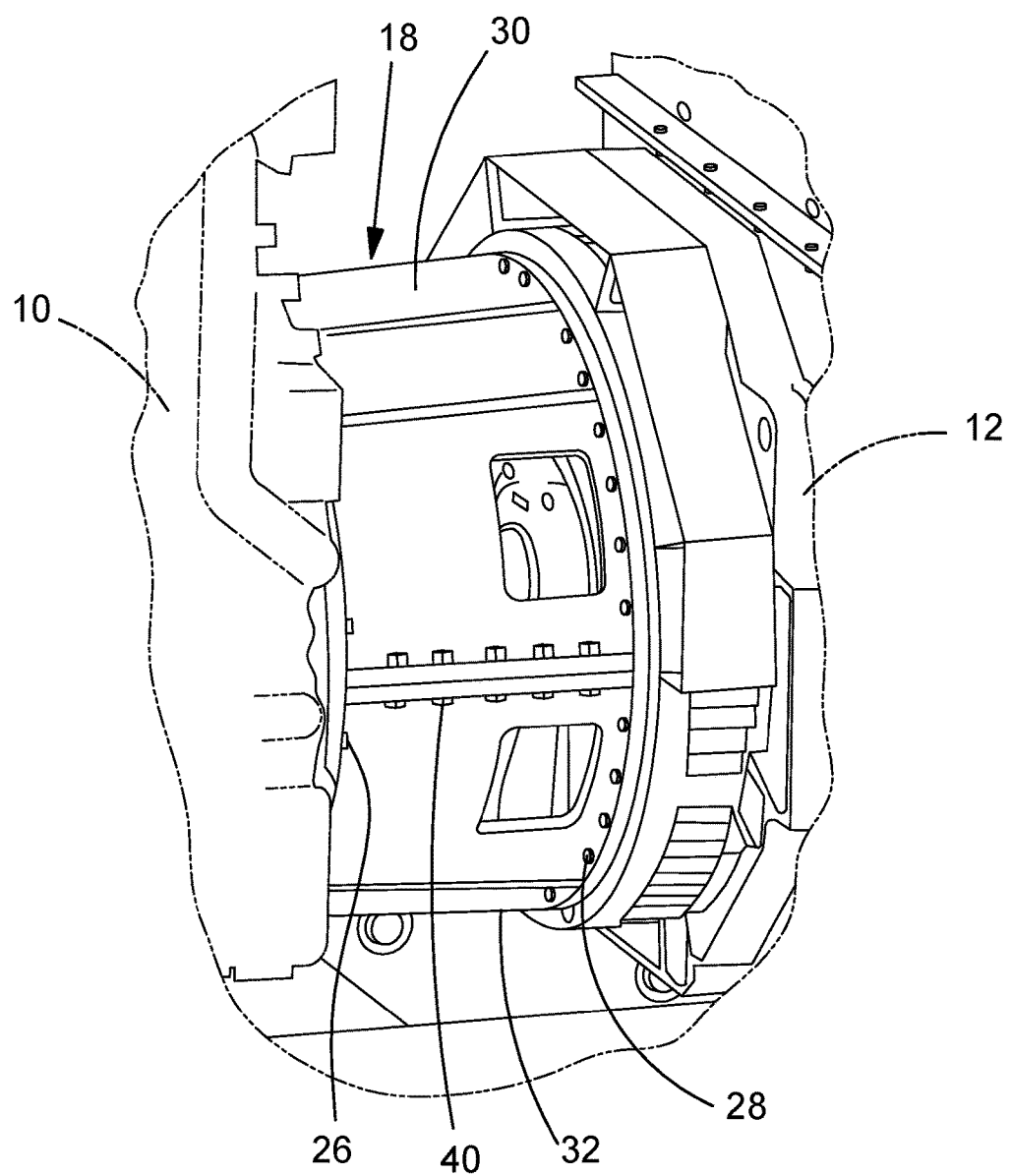
FIG. 3 shows part of the generating set with the adaptor in place.

FIG. 3 shows part of the generating set with the adaptor 18 in place. Referring to FIG. 3, the two parts 30, 32 of the adaptor 18 are held together by bolts 40. The adaptor is bolted to the engine 10 with bolts 26, and to the generator 12 with bolts 28.

Flexible Coupling

Figure 4:
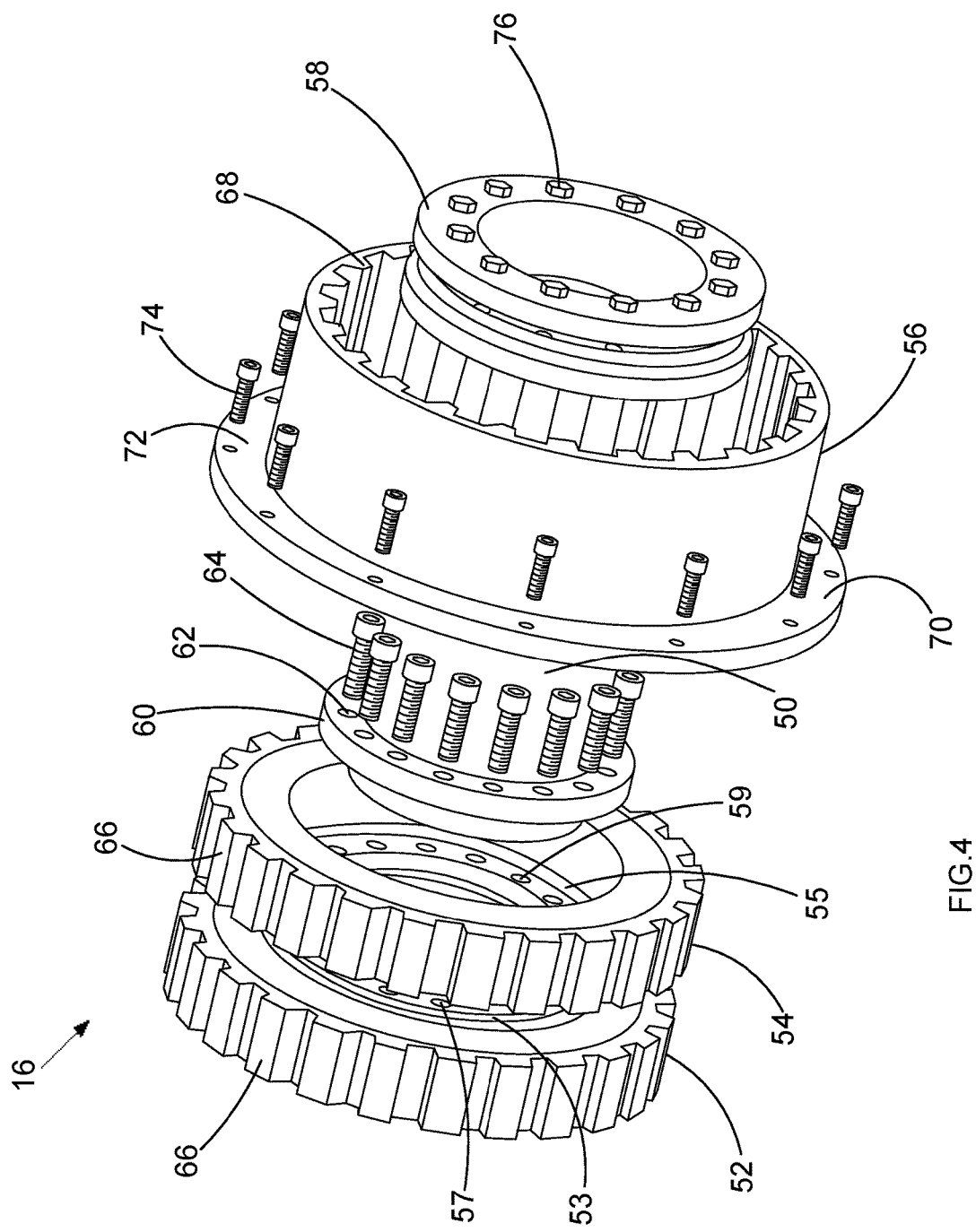
FIG. 4 is an exploded view of a coupling for use in an embodiment of the present invention.

FIG. 4 is an exploded view of a coupling 16 for use in an embodiment of the present invention. Referring to FIG. 4, the coupling comprises a hub 50, two elastomeric components 52, 54, a coupling flange 56, and a locking assembly 58. The hub 50 is arranged to be connected to the generator shaft, while the coupling flange 56 is arranged to be connected to the engine flywheel.

In the arrangement of FIG. 4, each of the elastomeric components 52, 54 is disc-shaped. The elastomeric components may be made from any suitable material having the required degree of flexibility, such as rubber. A sleeve 53, 55 is provided on the inside of each of the elastomeric components 52, 54. The sleeves are made from a rigid material such as a metal or a high density plastic. Each of the sleeves 53, 55 includes bolt holes 57, 59 for connecting the elastomeric components 52, 54 to the hub 50.

The hub 50 includes a hub flange 60 with bolt holes 62. Hub bolts 64 pass through the bolt holes 62 and the bolt holes 57, 59 in the sleeves 53, 55, in order to bolt the hub 50 to the elastomeric components 52, 54. When connected, part of the hub 50 passes through the inside of the second elastomeric component 54, while the end of the hub 50 engages with the sleeve 53 in the first elastomeric component 52.

The outside circumferences of the elastomeric components include castellations 66. The coupling flange 56 is generally cylindrical, and fits around the elastomeric components 52, 54. The inside surface of the coupling flange includes castellations 68, which engage with the castellations 66 on the outside of the elastomeric components 52, 54.

The coupling flange 56 includes a flange 70 with bolt holes 72. Flange bolts 74 are used to bolt the coupling flange to the engine fly wheel through the bolt holes 72. The external locking assembly 58 comprises bolts 76 which are used to hold the coupling together.

The coupling shown in FIG. 4 provides a torsionally soft connection between the engine and the generator. A flexible torque transmission characteristic is achieved by means of the elastomeric components 52, 54 between the hub 50 and the coupling flange 56. This can allow the absorption of torsional vibrations and may help to compensate for misalignments.

Servicing

In use the elastomeric components 52, 54 shown in FIG. 4 may degrade and require replacement. FIGS. 5 to 13 illustrate a process for replacement of the elastomeric components 52, 54 without requiring removal of the generator 12.

Figure 5:
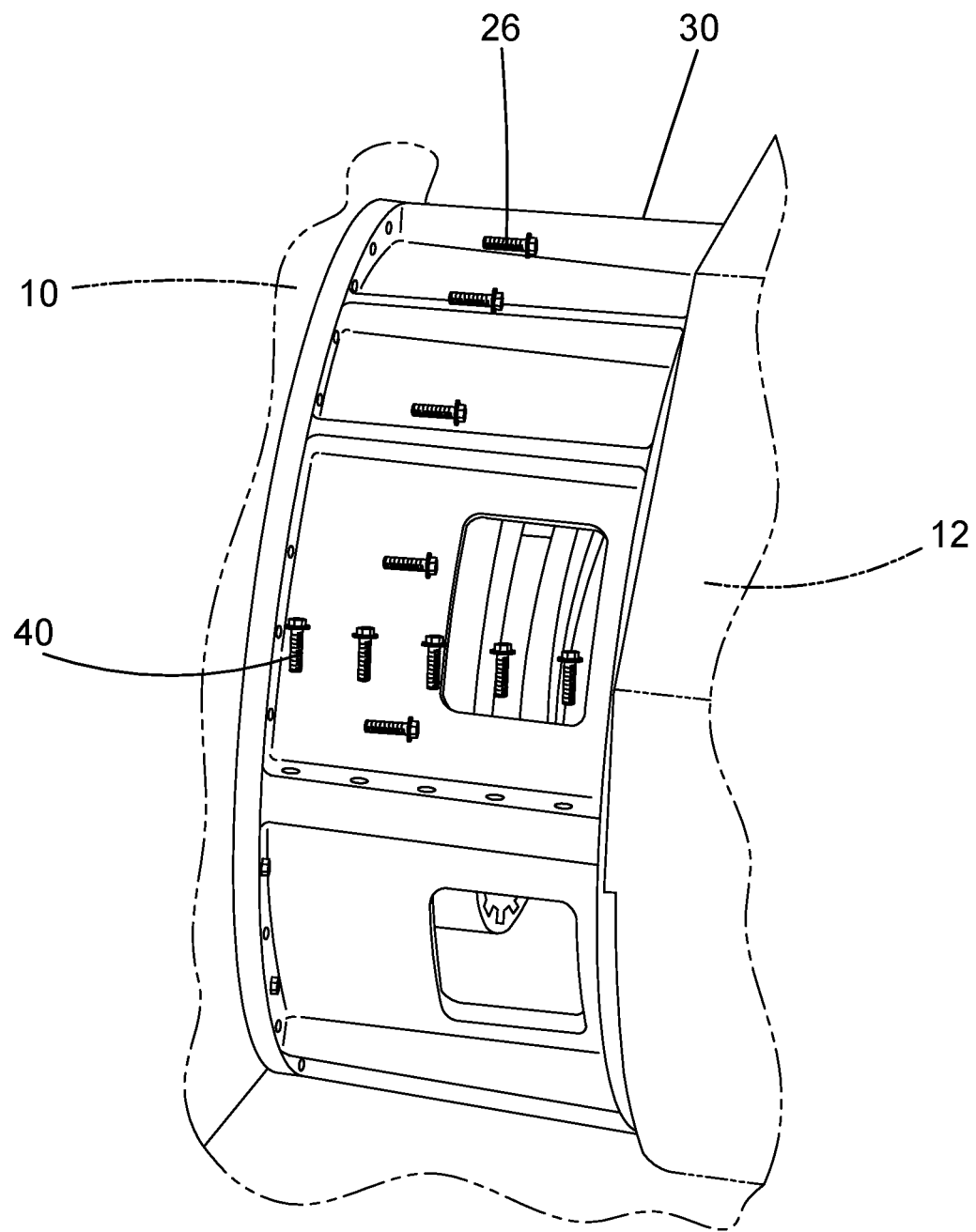
FIGS. 5 to 13 illustrate a process for replacement of elastomeric components in the coupling.

Referring to FIG. 5, in step 1 the adaptor bolts 26 connecting the top part 30 of the adaptor 18 to the engine 10, and the adaptor bolts 28 connecting the top part 30 of the adaptor 18 to the generator 12, are undone. In addition, the bolts 40 connecting the two parts of the adaptor 18 together are undone.

Figure 6:
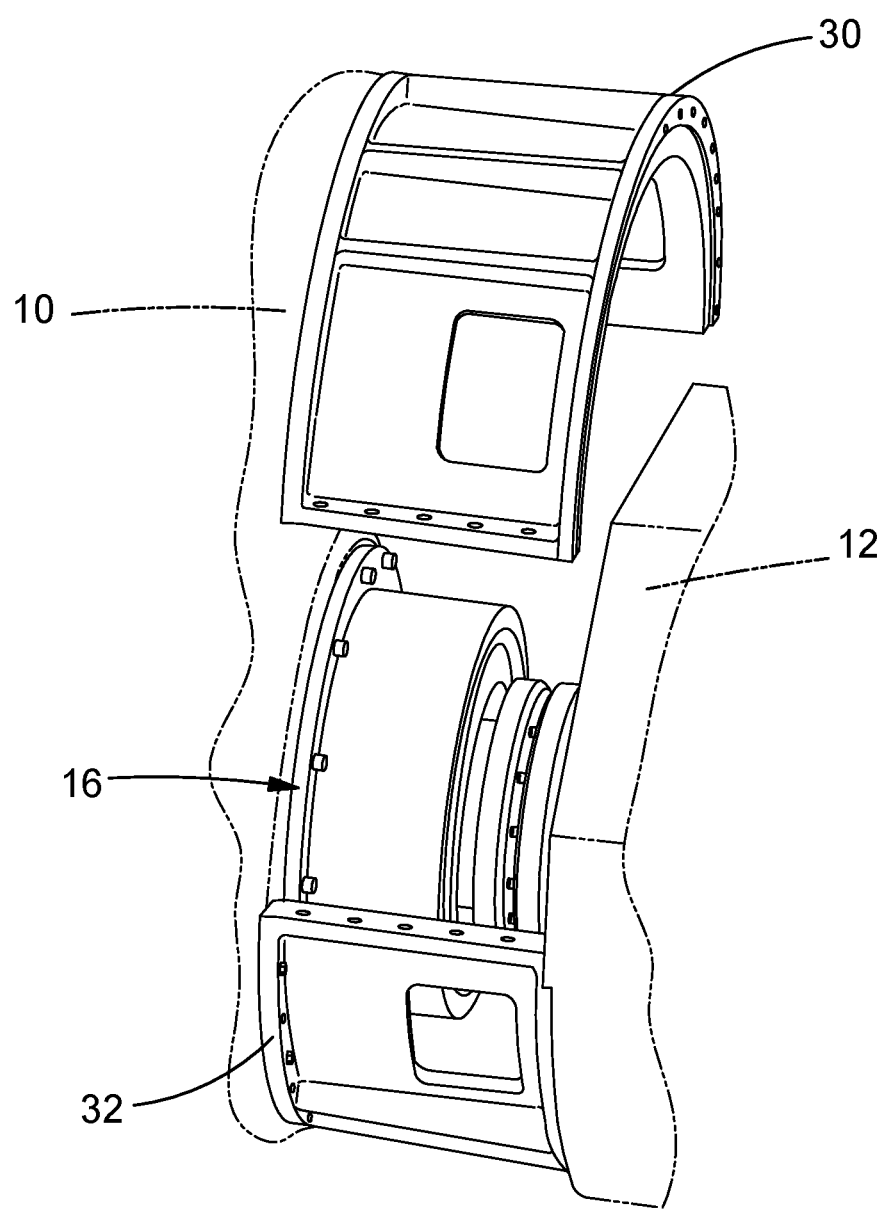

Referring to FIG. 6, in step 2 the top part 30 of the adaptor is removed from the generator set in a radial direction. Removal of the top part of the adaptor exposes the coupling 16.

Figure 7:
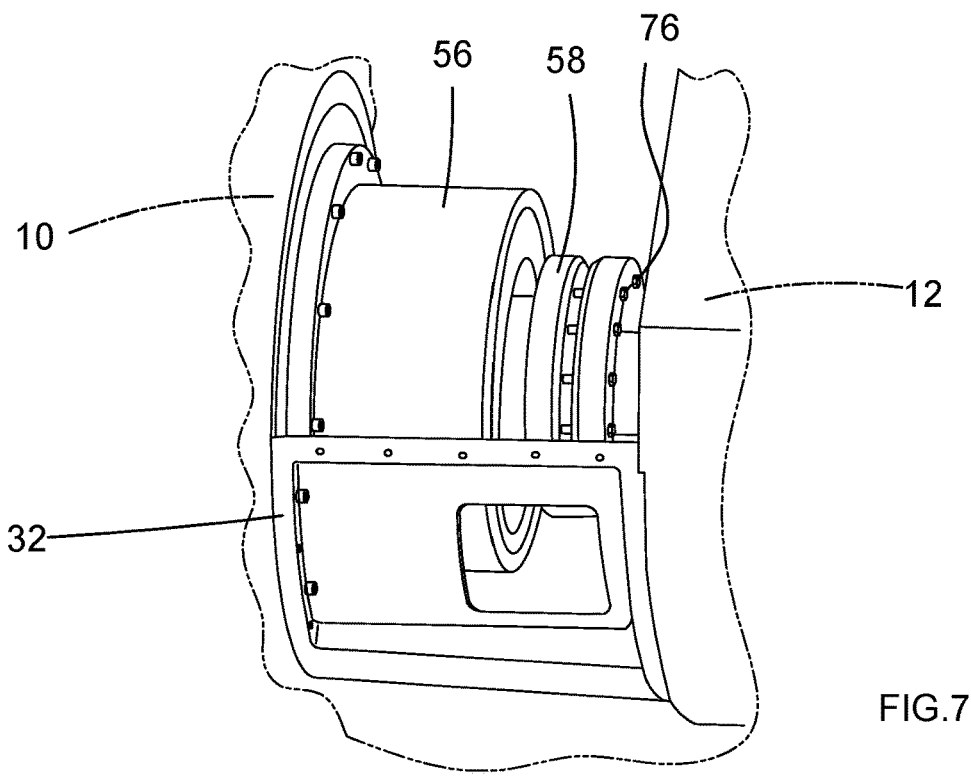

Referring to FIG. 7, in step 3 the bolts 76 of the external locking assembly 58 are undone. The locking assembly 58 is then slid axially along the shaft towards the generator 12. This exposes the hub bolts 64.

Figure 8:
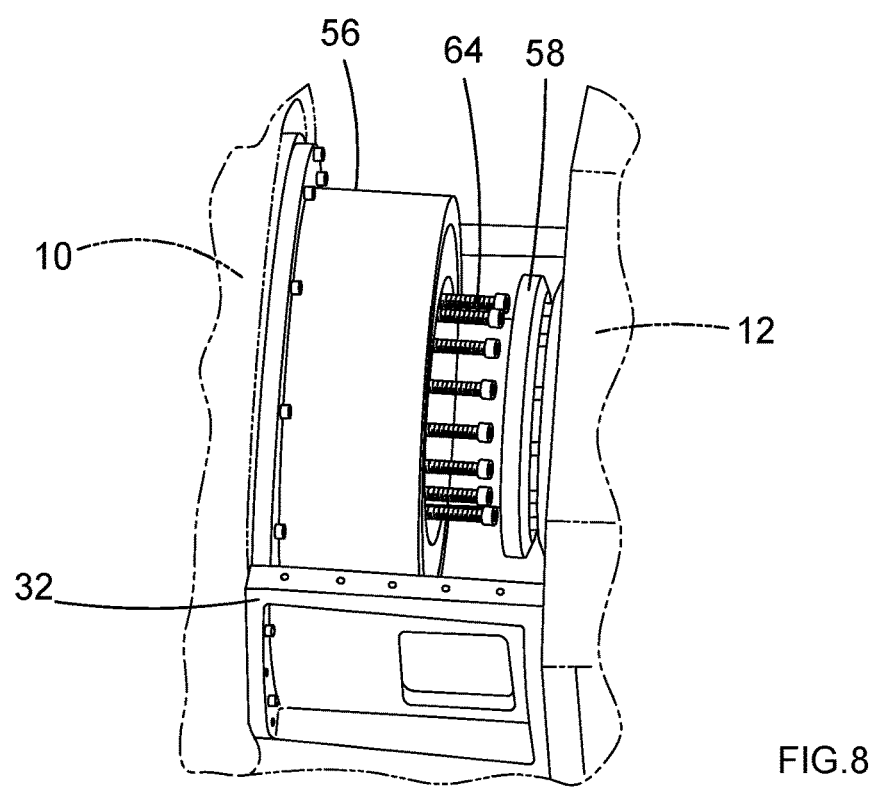

Referring to FIG. 8, in step 4 the hub bolts 64 are undone and removed. This disconnects the elastomeric components 52, 54 from the hub 50.

Figure 9:
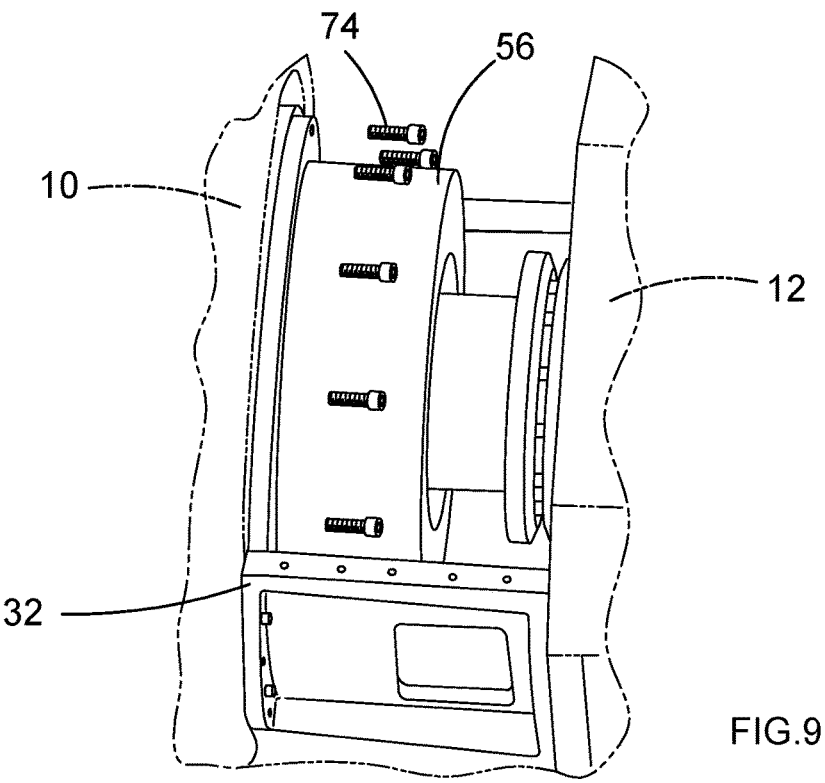

Referring to FIG. 9, in step 5 the coupling flange bolts 74 are undone and removed. This disconnects the coupling flange 56 from the engine 10.

Figure 10:
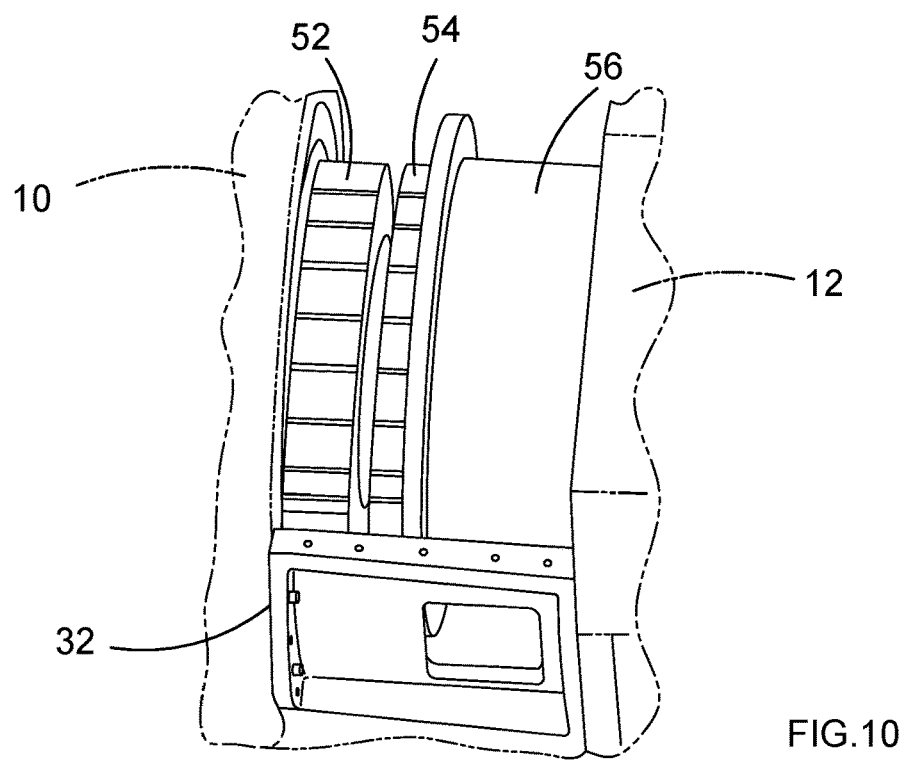

Referring to FIG. 10, in step 6 the coupling flange 56 is slid axially along the shaft towards the generator 12. This reveals the first elastomeric component 52 and part of the second elastomeric component 54. In this position the coupling flange 56 is held in place, for example, with a lifting device (not shown).

Figure 11:
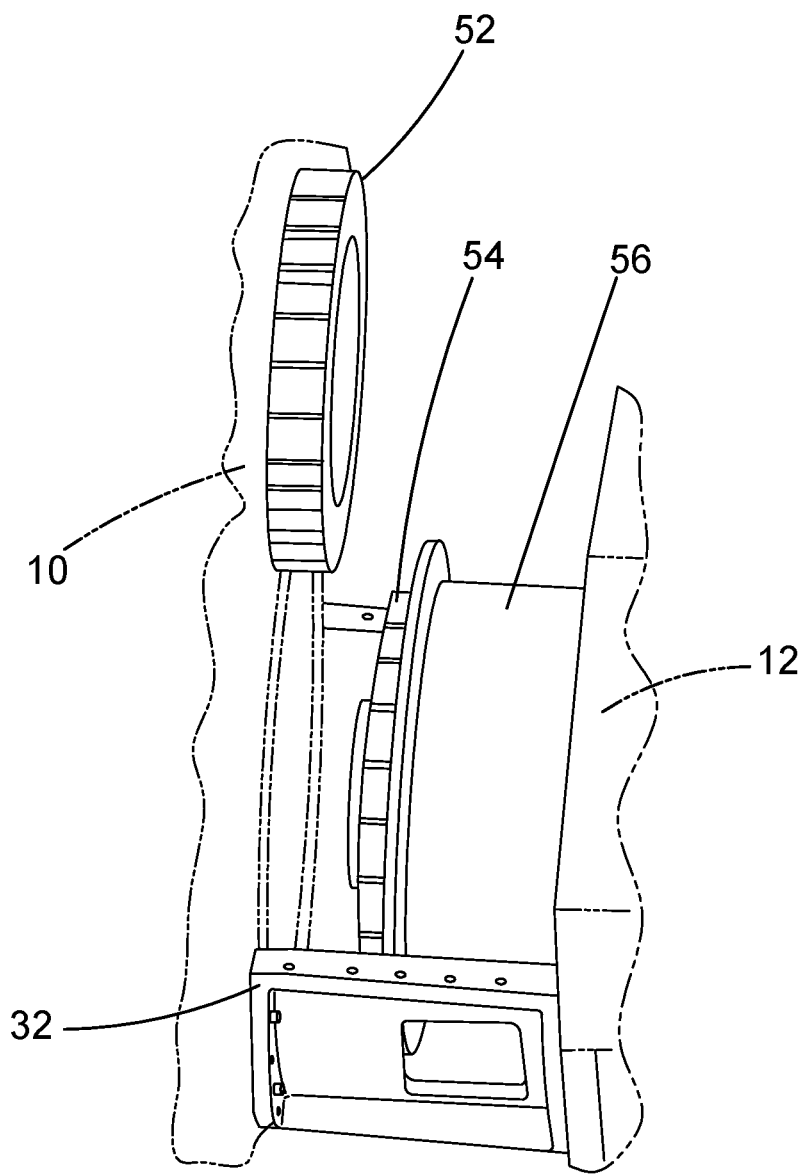

Referring to FIG. 11, in step 7 the first elastomeric component 52 is then removed in a radial direction. Removal of the elastomeric component 52 is possible due to the fact that the hub bolts 64 have been removed and the coupling flange 56 has been pulled back.

Figure 12:
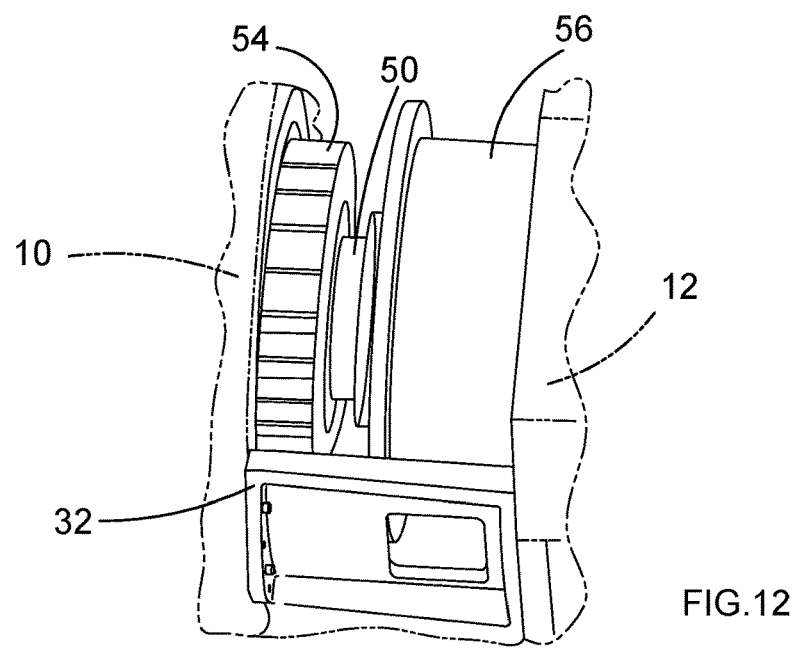

Referring to FIG. 12, in step 8 the second elastomeric component 54 is then slid axially along the hub 50 in the direction of the engine 10. This releases the elastomeric component 54 from the hub.

Figure 13:
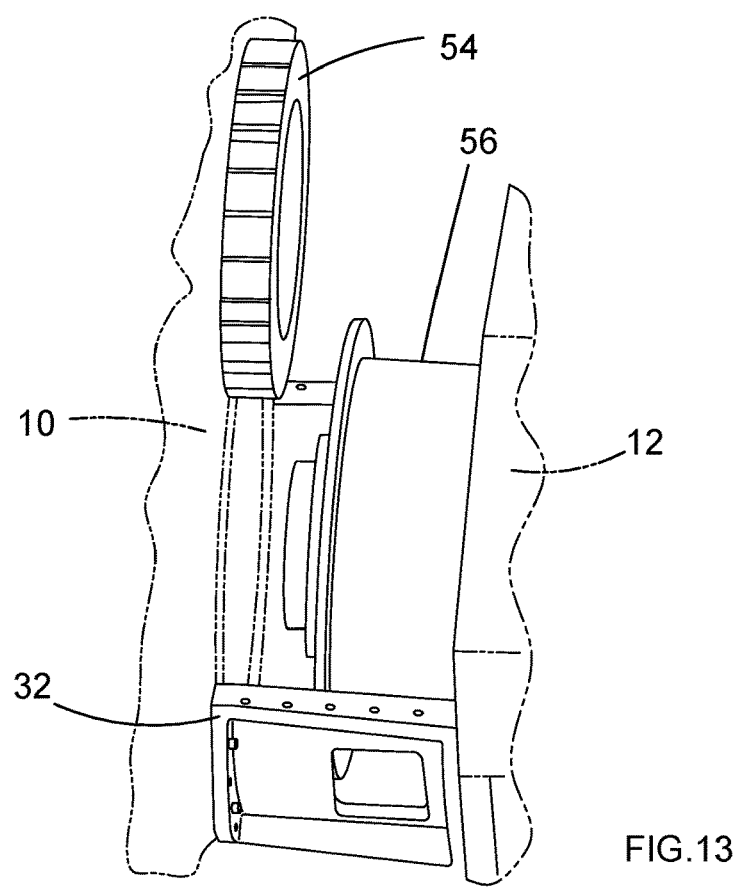

Referring to FIG. 13, in step 9 the second elastomeric component 54 is then removed in a radial direction.

The elastomeric components 52, 54 can then be replaced. Steps 1 to 9 are then repeated in reverse, in order to reassemble the coupling with the new elastomeric components.

Some of the advantages which may be provided by the techniques described above are as follows:
  No need to move the generator back when servicing the coupling
  Fewer steps for disassembly/assembly
  Servicing time reduced by 80% compared to previous techniques
  Less facility space required
  No need to disassemble other subsystems of the generator set, such as wires from the generator
  Lower cost of ownership to the end user.

In the above, embodiments of the invention have been described by way of example only, and variations in the design are possible. For example, the division between the two parts of the adaptor may be in different places and the two parts are not necessarily equal. It is not necessary for the adaptor to be divided along the whole of its length, and the removable part may extend along only part of the length of the adaptor. If desired, castellations may be provided on the interfaces between the two parts of the adaptor. Furthermore, if desired, the adaptor may comprise three or more parts, the only requirement being that at least one part of the adaptor is separable from the or each other part. Many other variations in detail will be apparent to the skilled person within the scope of the appended claims.

Although embodiments of the invention have been described with reference to a generator set, the present invention may be used with any type of power generation system where an adaptor is used to connect a prime mover to a generator.

The invention claimed is:

1. A power generation system comprising:
  a prime mover;
  a generator;
  an adaptor connected between non-rotating parts of the generator and the prime mover, wherein the adaptor is arranged to surround rotating components of the system, the adaptor comprising:
    a first flange for connecting the adaptor to the generator, the first flange comprising two first flange parts; and
    a second flange for connecting the adaptor to the prime mover, the second flange comprising two second flange parts,
  wherein the adaptor comprises two separable parts, the two parts of the adaptor are separable along lines which run in an axial direction between one end of the adaptor and the other, each part of the adaptor comprises one of the first flange parts for connection to the generator and one of the second flange parts for connection to the prime mover, and removal of at least one part of the two separable parts of the adaptor exposes the rotating components inside of the adaptor.

2. The power generation system according to claim 1, wherein the adaptor is bolted to the prime mover and to the generator.

3. The power generation system according to claim 1, further comprising a coupling for connecting rotating components of the generator and the prime mover, wherein the adaptor is arranged to surround the coupling, and removal of one part of the adaptor exposes the coupling.

4. The power generation system according to claim 3, wherein the coupling comprises an elastomeric component, and the elastomeric component is removable radially from the coupling.

5. The power generation system according to claim 4, wherein one part of the adaptor is removable to leave an opening while the other part of the adaptor remains in place, and the elastomeric component is removable through the opening.

6. The power generation system according to claim 4, wherein:
  the coupling comprises a hub and a coupling flange;
  the elastomeric component is located between the hub and the coupling flange; and
  the coupling flange can be moved axially in order to disengage with the elastomeric component.

7. The power generation system according to claim 1, wherein the two parts of the adaptor comprise a first part that is removable and a second part that is connected between the generator and prime mover.

8. The power generation system according to claim 7, wherein the first part of the adapter that is removable comprises at least one centering pin.

9. The power generation system according to claim 7, wherein the first part of the adapter comprises a flange for interfacing with the second part.

10. The power generation system according to claim 1, wherein the first flange and the second flange of the adaptor each comprise bolt holes.

11. The power generation system according to claim 1, wherein the two parts of the adaptor are connectable by means of bolts.

12. The power generation system according to claim 1, wherein the adaptor is in the form of an open cylinder, and the lines run between one open end of the cylinder and the other.

13. The power generation system according to claim 1, wherein each part of the two parts of the adaptor is semi-cylindrical.

* * * * *